INVENTOR.
DONALD WORTZMAN
BY John J. Goodwin
ATTORNEY

United States Patent Office 3,423,540

Patented Jan. 21, 1969

3,423,540
RECORD-REPRODUCE CIRCUIT

Donald Wortzman, Mahopac, N.Y., assignor to International Business Machines Corporation, Armonk, N.Y., a corporation of New York Filed Aug. 4, 1965, Ser. No. 477,120
U.S. Cl. 179—100.2 6 Claims
Int. Cl. G11b 5/00

Figure 1:
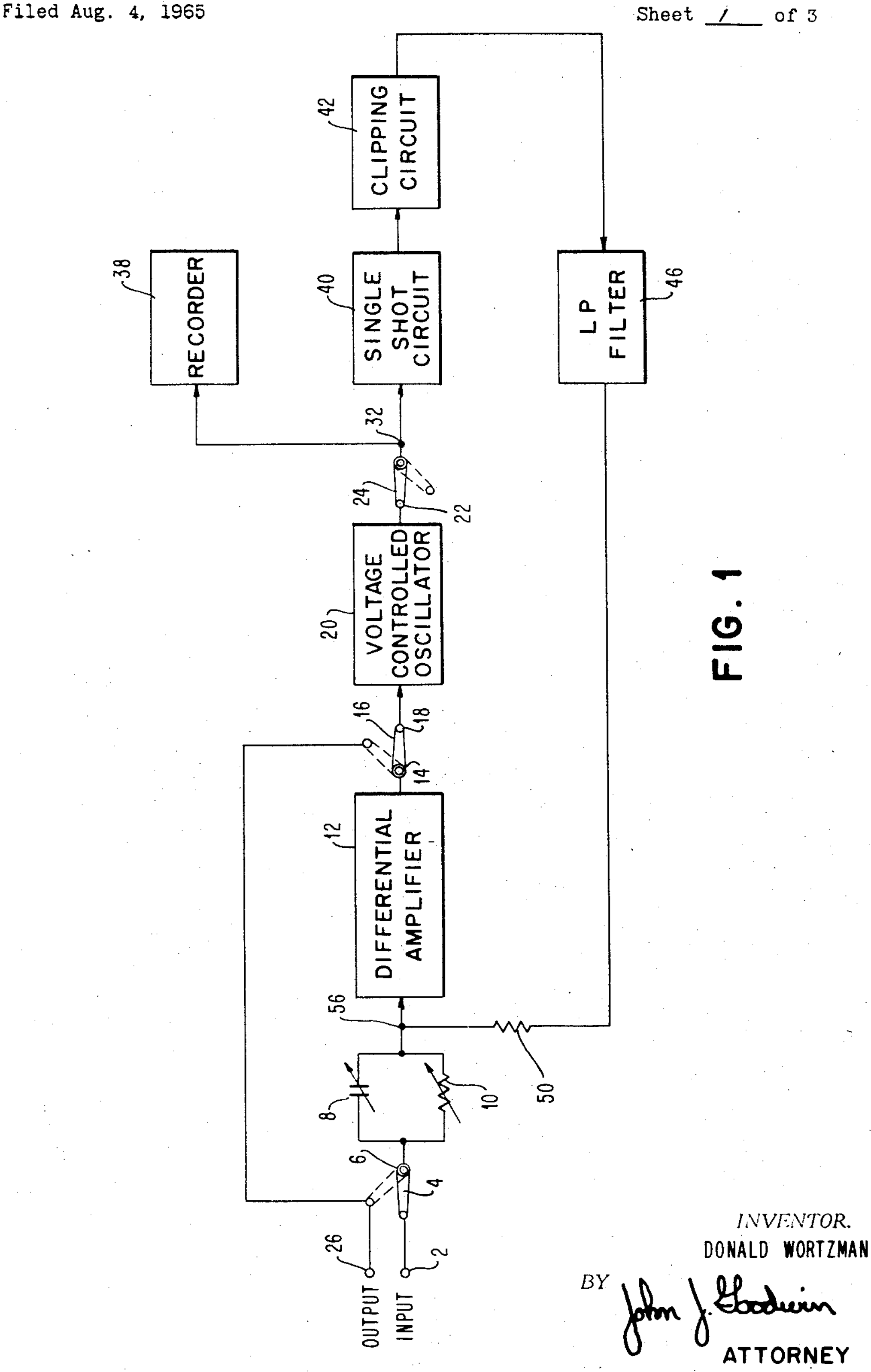

The present invention relates to a system for the recording and playback of analog signals and more particularly for a system wherein the same circuit elements used for recording are employed in reverse fashion for the playback. In the magnetic recording art electronic circuits are required to accomplish the recording and these cause distortion of the input signal, and these distortions are magnetically recorded along with the signal. In audio recordings, such as voice or music, these distortions are an annoyance, but in the recording of data, such as electrocardiographs, such distortions may cause significant errors in interpretation of the data. Efforts have been made to eliminate or reduce distortion by critical selection and design of the electronic circuit elements. However, this is costly and there is no guarantee that distortions will not later occur after the system has been in use. In the present invention, a system is provided wherein errors and distortions are compensated for by employing the same recording circuitry for the playback mode, but in reverse fashion.

An object of the present invention is to provide an improved recording and playback system wherein common circuits are used for the recording and playback functions.

Another object of the present invention is to provide a recording system including an operational amplifier having an input circuit and a feedback circuit.

A further object of the present invention is to provide a recording system as described wherein the recording mode input circuit is employed as the playback mode feedback circuit and the recording mode feedback circuit is employed as the playback mode input circuit of the operational amplifier.

The foregoing and other objects, features and advantages of the invention will be apparent from the following more particular description of a preferred embodiment of the invention, as illustrated in the accompanying drawings.

In the drawings:

FIG. 1 is a schematic block diagram of an embodiment of a recording and playback system according to the principles of the present invention.

Figure 2A:
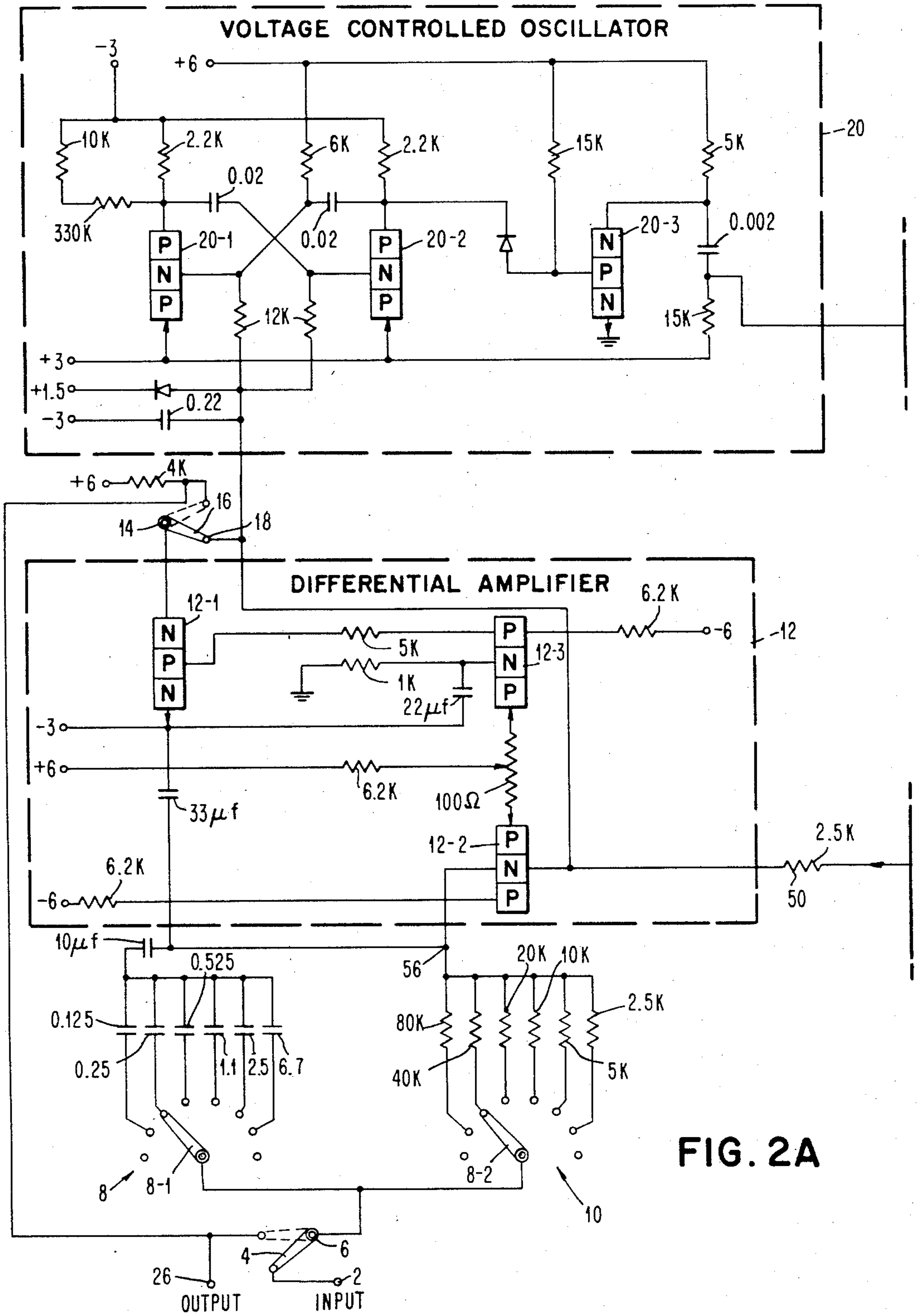
Figure 2B:
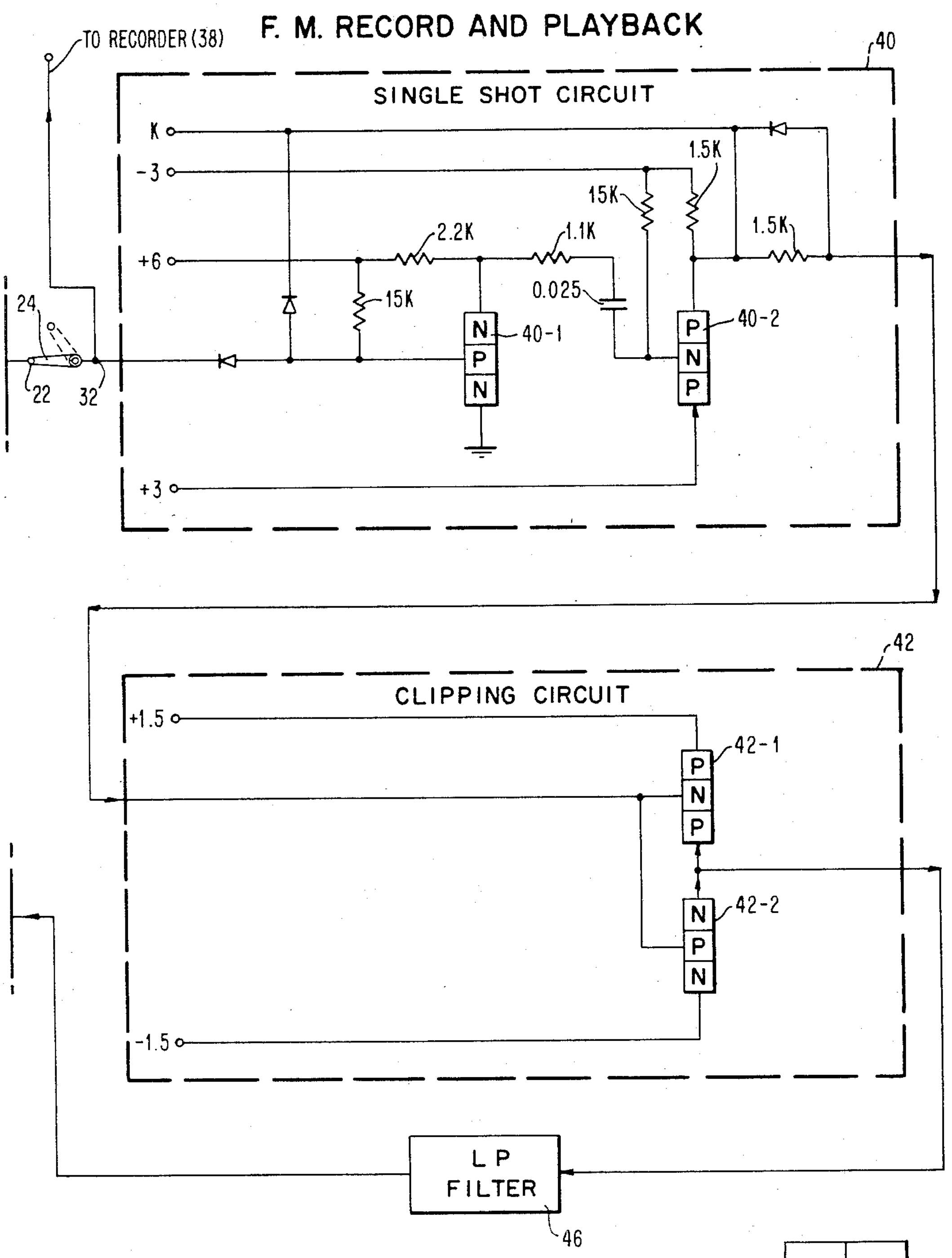
Figure 2:
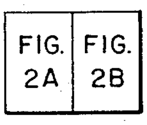

FIGS. 2A and 2B combined as shown in FIG. 2 form a schematic circuit diagram of the embodiment shown in FIG. 1.

Referring to FIG. 1 a schemattic block diagram of a recording and playback system wherein analog signals are recorded in FM form is shown. Several of the units included in the system are shown interconnected by switches. The switch blades are shown as solid lines for the record mode and as dotted lines in the playback mode. The analog signal to be recorded is applied to an input terminal 2 (by a suitable input means, etc.), and it is connected through switch blade 4 to point 6 and is passed through a resistor-capacitor parallel combination composed of variable resistance 10 and variable capacitance 8. The analog signal is then combined with a signal at point 56 and the resultant signal is applied as an input to differential amplifier 12. The output signal from differential amplifier 12 at output terminal 14 is connected through switch blade 16 to the input terminal 18 of voltage controlled oscillator 20. Voltage controlled oscillator 20 produces an output signal having a frequency that is a function of the amplitude of the analog input signal. The output from the voltage controlled oscillator 20 is applied from output terminal 22 through switch blade 24 to input terminal 32 as an input signal to a magnetic recorder means 38, for example, a conventional tape recorder. The output from voltage controlled oscillator 20 at input terminal 32 is also connected to a single shot circuit 40. Thus, the oscillating signal from voltage controlled oscillator 20 being recorded as an FM signal in recorder 38 is also employed to trigger single shot circuit 40 and produce a series of output pulses therefrom. The output pulses from single shot 40 are applied to a clipping circuit 42. Clipping circuit 42 is employed to maintain the output signal from single shot 40 at accurate output voltage levels. The output signal from clipping circuit 42 is then passed through a low pass filter 46 and then through a resistor 50 to point 56 at the input of the differential amplifier 12 where it is combined with the analog input signal.

In the playback mode switch blades 4, 16, and 24 are moved to their other position as represented in FIG. 1 by dotted lines. The recorded signal is played back from recorder 38 and is applied to single shot 40, the output of which is applied through clipping circuit 42 and through resistor 50 to point 56 at the input of differential amplifier 12. The output of differential amplifier 12 in the playback mode is conducted across the parallel network composed of resistance 10 and capacitance 8, across switch blade 4 to junction 6 as a feedback signal and also to terminal 26 as an output signal.

The function of the voltage controlled oscillator 20 in FIG. 1 is to convert the analog input signal into FM form so it can be recorded by the recorder 38. The single shot circuit 40, the clipping circuit 42, and the filter circuit 46 process the FM signal and return it to analog form at the output of filter 46. Thus, the zero crossings of the FM signal from either the voltage controlled oscillator in the record mode or the recorder 38 in the playback mode cause output pulses to be produced from single shot circuit 40. The output pulses from single shot circuit 40 are clipped at a fixed positive and negative level by clipping circuit 42. Thus, the output of clipping circuit 42 is a signal, the duration of which is dependent upon the frequency of the FM signal. The filter 46 is responsive to the output signal from the clipping circuit 42 and smooths it into the analog signal of the FM signal from either voltage controlled oscillator 20 or recorder 38. During the record mode therefor the same analog signal which is being recorded in FM fashion in recorder 38 appears at the output of filter 46. Likewise in the playback mode, the signal recorded in FM fashion in recorder 38 appears in analog form at the output of filter 46. Thus, the single shot circuit 40, the clipping circuit 42, and the filter 46 in series act as a detector circuit for converting FM signals to analog signals.

Differential amplifier 12 serves as an operational amplifier. An operational amplifier is a high gain amplifier having an input impedance and a feedback impedance loop. The gain of an operational amplifier is the ratio of the feedback impedance $Z_2$ to the input impedance $Z_1$ and the voltage and current at the input of the operational amplifier tries to become zero and this point is referred to as a virtual ground. In the record mode, as can be seen in FIG. 1, the input signal at terminal 2, before being applied to the differential amplifier 12, is first passed through the parallel combination of resistor 10 and capacitor 8. This combination will be referred to as impedance $Z_1$. The output of the differential amplifier, after being converted into FM form and then reconverted into analog form at the output of filter 46, is applied back to the input point 56 of the differential amplifier 12 through resistor 50 which will be referred to as feedback impedance $Z_2$. Thus, according to operational amplifier theory, the gain $K_1$ of the differential amplifier is $Z_2/Z_1$. In playback, however, the ratio of the impedance is reversed. Considering that the input analog signal has been recorded at the recorder 38, it can be considered as being identical to the original input signal but in FM form. The FM signal from recorder 38, however, appears at the output filter 46 during playback in analog form and is applied through an input resistor 50 as the input signal to differential amplifier 12. Thus, impedance $Z_2$ becomes the input impedance to the differential amplifier 12 in the playback mode. At the same time a feedback loop for differential amplifier 12 is provided through switch blade 16 and through the parallel combination of resistor 10 and capacitor 8 to point 56. Thus, the operational amplifier feedback impedance becomes $Z_1$ and the gain $K_2$ of the operational amplifier in the playback mode is $Z_1/Z_2$, the inverse of the record gain. The overall gain when a signal is recorded and then played back is $$K_1 \times K_2 = \frac{Z_2}{Z_1} \times \frac{Z_1}{Z_2} = 1$$

This means that a signal which is recorded and then played back has always a constant gain regardless of the components within the record and playback circuit. Thus, the voltage controlled oscillator 20 might be very nonlinear and yet nonlinearity will be compensated for and the playback of the recorded signal will be undistorted.

The reason that $Z_1$ is shown as including variable capacitor 8 is that the system in FIG. 1 is presumed to be operating with relatively low frequency input signals (i.e., 0.30 cycles per second). For higher frequencies the impedance of capacitor 8 (and therefore the impedance of $Z_1$) is lowered and a pre-emphasis effect is obtained. In playback $Z_1$ is in the feedback loop and a de-emphasis effect is obtained. Therefore, high frequency noise introduced after recording is de-emphasized without distorting the original signal. Both capacitor 8 and resistor 10 are variable so that the system may be adjusted when inputs of different amplitude ranges are provided in different system applications and environments.

The system shown in FIG. 1 includes circuit elements which should be known to one skilled in the art. The circuit details of a differential amplifier, a voltage controlled oscillator, a single shot circuit, a clipping circuit, a filter, and a recorder of the type described are readily available in the prior art. A great many different designs may be employed for any component, for example, the prior art provides a wide choice of single shot circuits, clipping circuits, filters, etc. which may be included in the design of the system of FIG. 1. One example of a circuit design which may be employed in the embodiment of FIG. 1 is shown in FIGS. 2A and 2B. Each of the separate circuits in FIGS. 2A and 2B is known in the prior art and the operation of such should be obvious to one skilled in the art, therefore a detailed explanation of the operation of the various circuit elements of the circuits in FIGS. 2A and 2B will not be provided.

In FIGS. 2A and 2B then input terminal 2 is shown connected through a switch blade 4 to a bank of capacitors 8 and a bank of resistors 10 having values as indicated. A desired resistor-capacitor combination may be provided by the operation of switch 8–1 and switch 8–2. The output of the resistor and the capacitor combination is connected at point 56, which is the input terminal of the differential amplifier 12. The differential amplifier 12 includes an NPN transistor 12–1 and two PNP transistors 12–2 and 12–3. The output terminal 14 of differential amplifier 12 is connected to the collector of transistor 12–1. The voltage at output terminal 14 is regulated by the voltage at the base of transistor 12–2. The voltage at the base of transistor 12–2 is a combination of the input voltage at point 56 and the voltage at resistor 50. The output signal from differential amplifier 12 at terminal 14 is connected across switch blade 16 to terminal 18 which is the input terminal for voltage controlled oscillator 20. Voltage controlled oscillator 20 includes an astable multivibrator having PNP transistors 20–1 and 20–2 and an NPN transistor 20–3 which controls the speed of the output pulses of the multivibrator. The output terminal 22 of the voltage controlled oscillator 20 is connected via switch blade 24 to input terminal 32 of single shot circuit 40. Input terminal 32 is also connected to the recorder 38 (not shown).

Single shot circuit 40 includes an NPN transistor 40–1 and a PNP transistor 40–2. The R-C time constants of single shot circuit 40 are designed such that the pulse width of the output signal of single shot circuit 40 is slightly shorter than a minimum period of the astable multivibrator within voltage controlled oscillator 20. The output from single shot circuit 40 is applied to a clipping circuit 42.

Clipping circuit 42 includes a PNP transistor 42–1 and an NPN transistor 42–2 which are connected to potential sources such that the signals from single shot circuit 40 are clipped at accurate levels of ±1.5 volts. The output signal from clipping circuit 42 is passed through a conventional low pass filter 46 and through resistor 50 back to the base of transistor 12–2 of differential amplifier 12. Since the base of transistor 12–2 is connected to point 56, the resistor 50 is essentially electrically connected to point 56 as depicted in FIG. 1.

In the playback mode switch blades 4, 16, and 24 are moved so that point 6 is connected to output terminal 16. The output terminal 14 of differential amplifier 12 is connected to output terminal 26 and also through switch blade 4 to the resistor and capacitor 10 and 8 as a feedback loop. The movement of switch blade 24 disconnects the output of voltage controlled oscillator 20 from both the recorder 38 and the single shot circuit 40. The values of the power supply potentials and the circuit components are in accordance with known circuit design techniques and are included in FIGS. 2A and 2B in the interests of providing a complete embodiment.

What has been provided, therefore, is a system for use with a recording means such as a magnetic recorder. The same system components that are used in the recording mode are employed in reverse fashion in the playback mode so that any distortions occurring and which are recorded in the record mode are compensated for in the playback mode and the resultant signal which is played back is distortion free. Critical design tolerances of any of the circuit elements is not required and nonlinearities, etc., can be tolerated since the distortion resulting therefrom will effectively be cancelled during the playback mode.

An operational amplifier function is produced wherein the input impedance in the record mode becomes the feedback impedance in the playback mode, and the input impedance in the playback mode becomes the feedback impedance in the record mode.

While the invention has been particularly shown and described with reference to a preferred embodiment thereof, it will be understood by those skilled in the art that various changes in form and details may be made therein without departing from the spirit and scope of the invention.

What is claimed is:

1. A system for recording and playing back analog signals comprising, a first impedance means, a second impedance means, an amplifier means, a recording means, and a switching means connected to said first impedance means, said second impedance means, said amplifier means, and said recording means, said switching means having a first switch position for connecting said first impedance means, said amplifier means, and said recording means in series circuit and said amplifier means and said second impedance means in parallel circuit and a second switch position for connecting said recording means, said second impedance means and said amplifier means in series circuit and said first impedance means and said amplifier means in parallel circuit, said first and second switch position of said switching means being mutually exclusive.

2. A system for recording and playing back analog signals comprising an input terminal responsive to a source of analog input signal,
- a first impedance means,
- amplifier means coupled to said first impedance means,
- a recording channel,
- a second impedance means connected between said recording channel and the junction of said amplifier means and said first impedance means,
- switching means connected to said first impedance, said second impedance and said recording channel, said switching means having first and second mutually exclusive switch positions,
- said first switch position connecting said input terminal to said first impedance and said amplifier means to said recording channel, and said second impedance producing a series recording circuit for said analog signal from said input terminal through said first impedance means and said amplifier means to said recording channel and a feedback circuit including said second impedance in parallel circuit with said amplifier means,
- and said second switch position connecting said amplifier means in parallel circuit with said first impedance means and in series circuit with said second impedance and said recording channel to produce a playback circuit from said recording channel through said second impedance and said amplifier means.

3. A system according to claim 2 wherein said recording channel includes a voltage controlled oscillator connected to the output of said amplifier means,
- a recording means connected to the output of said voltage controlled oscillator,
- a single shot circuit connected to the outputs of said voltage controlled oscillator and said recording means,
- a clipping circuit connected to the output of said single shot circuit,
- and a filter connected to the output of said clipping circuit,
- in said first switch position said voltage controlled oscillator producing an output signal having a frequency proportional to the amplitude of the output signal from said amplifier means,
- said recording means recording the output signal from said voltage controlled oscillator,
- said single shot circuit, clipping circuit, and filter in series detecting said output signal from said voltage controlled oscillator and producing an analog output signal representative of the frequency thereof.

4. A system according to claim 3 wherein said second switch position, said single shot circuit, said clipping circuit, and said filter circuit in series is responsive to the recorded signal from said recording means for producing an output analog signal representative of the frequency thereof.

5. A recording system comprising,
- a source of analog signal,
- a first impedance means having an input connected to said source of analog signal,
- an amplifier means connected to said first impedance for amplifying said analog signal,
- frequency modulating means connected to the output of said amplifier means to convert said analog signal to a frequency modulated signal,
- a recorder means connected to said frequency modulating means for recording said frequency modulated signal,
- detector means connected to said frequency modulating means and said recorder means to convert said frequency modulated signal to an analog signal,
- and a second impedance means connected between said detector means and the junction of said first impedance means and said amplifier means for applying said analog signal from said detector means to said amplifier means as a feedback signal.

6. A system according to claim 5 further including a switching means for disconnecting said frequency modulating means from said recorder means and said detector means to form a series circuit from said recorder means through said detector means and said second impedance means, said detector means converting the recorded frequency modulated signal from said recorder means to an analog signal, and said second impedance means connecting said analog signal to the input of said amplifier means,
- said switching means also connecting the output of said amplifier means to the input of said first impedance means to form a feedback circuit from the output of said amplifier, through said first impedance means to the input of said amplifier.

References Cited

UNITED STATES PATENTS

| | | | |
|---|---|---|---|
| 2,658,956 | 11/1953 | Begun | 179—100.2 |
| 2,909,617 | 10/1959 | Shields | 179—100.2 |
| 2,921,991 | 1/1960 | Sher | 179—100.2 |
| 3,037,093 | 5/1962 | Nowlan | 179—100.2 |

STANLEY M. URYNOWICZ, Jr., *Primary Examiner.*

V. P. CANNEY, *Assistant Examiner.*

U.S. Cl. X.R.

346—74